United States Patent
Amzaleg et al.

(10) Patent No.: US 10,545,020 B2
(45) Date of Patent: Jan. 28, 2020

(54) SYSTEM, A METHOD AND A COMPUTER PROGRAM PRODUCT FOR SIZE ESTIMATION

(71) Applicant: Applied Materials Israel Ltd., Rehovot (IL)

(72) Inventors: Moshe Amzaleg, Beer Sheva (IL); Nir Ben-David Dodzin, Hod Hasharon (IL)

(73) Assignee: APPLIED MATERIALS ISRAEL, LTD., Rehovot (IL)

( * ) Notice: Subject to any disclaimer, the term of this patent is extended or adjusted under 35 U.S.C. 154(b) by 805 days.

(21) Appl. No.: 13/831,446

(22) Filed: Mar. 14, 2013

(65) Prior Publication Data

US 2014/0278227 A1 Sep. 18, 2014

(51) Int. Cl.
G01B 21/02 (2006.01)

(52) U.S. Cl.
CPC .................. G01B 21/02 (2013.01)

(58) Field of Classification Search
CPC .................................................. G01B 21/02
See application file for complete search history.

(56) References Cited

U.S. PATENT DOCUMENTS

| | | | |
|---|---|---|---|
| 4,344,142 A * | 8/1982 | Diehr, II | B29C 35/0288 264/325 |
| 5,659,172 A | 8/1997 | Wagner et al. | |
| 5,699,447 A | 12/1997 | Alumot et al. | |
| 5,808,735 A * | 9/1998 | Lee | G01N 21/9501 250/559.42 |
| 5,982,921 A | 11/1999 | Alumot et al. | |
| 6,178,257 B1 | 1/2001 | Alumot et al. | |
| 2003/0048939 A1* | 3/2003 | Lehman | G01N 21/9501 382/144 |
| 2004/0084619 A1* | 5/2004 | Hartig | G01N 23/2251 250/307 |
| 2005/0121628 A1* | 6/2005 | Aoyama | G03F 1/36 250/492.22 |
| 2009/0046896 A1* | 2/2009 | Yamaguchi | G06K 9/4604 382/106 |
| 2014/0278227 A1* | 9/2014 | Amzaleg | G01B 21/02 702/155 |

OTHER PUBLICATIONS

Alice Corp vs Cls Bank (Supreme Court Decision) (2013).*

* cited by examiner

*Primary Examiner* — Hyun D Park
(74) *Attorney, Agent, or Firm* — Lowenstein Sandler LLP

(57) ABSTRACT

A computerized method for estimating a size of a nanometric part of an inspected article, the method including: (a) acquiring inspection results generated by processing an inspection image which was generated by collecting signals arriving from a portion of the article which includes the part by an inspection system; (b) fitting to the inspection results an approximation function from a group of functions which is related to a response pattern of the inspection system; and (c) determining an estimated size of the part, based on at least one parameter of the approximation function.

20 Claims, 7 Drawing Sheets

510 obtaining a preliminary inspection image which is generated by collecting signals arriving from an inspected article 511 processing the inspection image for identifying a candidate part of the article for size estimation (e.g. by detecting a potential defect)

512 determining the inspection image which will be analyzed in order to estimate the size of the part 520 acquiring inspection results generated by processing an inspection image which was generated by collecting signals arriving from a portion of the article which includes the part 521 processing the inspection image to provide an array of values, wherein each value of the array is determined based on the inspected values of a row of pixels of the inspection image 530 fitting to the inspection results an approximation function from a group of functions 540 determining an estimated size of the part of the article, based on at least one parameter of the approximation function

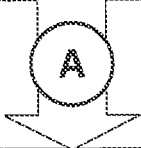

550 determining a presence of a defect in the part, based on the estimated size

560 Providing detection results which are based on a result of the determination of stage 550

570 Selectively applying one or more industrial processes in response to a result of the determination of the presence of the defect

500          FIG. 3

SYSTEM, A METHOD AND A COMPUTER PROGRAM PRODUCT FOR SIZE ESTIMATION

FIELD OF THE INVENTION

This disclosure relates to systems, methods and computer program products for size estimation.

BACKGROUND OF THE INVENTION

Estimating size of defects or other outstanding parts in inspection images may be used in various fields of art, such as in wafer inspection. Inspection images are images in which the color value of each pixel corresponds to radiation reflected (and possibly also emitted) from a part of the inspected article (e.g. the wafer).

Some prior art techniques of defect size estimation attempt to estimate the size of the defect based on the intensity levels of the pixels in which the defect is imaged. However, such techniques of estimation are based on many assumptions—regarding the shape of the defect (usually circular), the material from which the defect is made from as well as the material from which the environment of the defect is made of (for assuming reflection coefficients), and so on.

However, failing to correctly parameterize the defect and its environment would lead to considerable errors in those techniques. For example—two defects which are of the same size but which have a different shape and/or are made from different materials (or having different textures) would reflect differently and would therefore result in different intensity levels in the inspection image, and in erroneous estimation of their respective sizes. Prior art techniques which are based solely on intensity levels would estimate such equally sized defects to be of different dimensions.

There is therefore a need for systems and methods for size estimation.

Current demands for high density and performance associated with ultra large scale integration require submicron features, increased transistor and circuit speeds and improved reliability. Such demands require formation of device features with high precision and uniformity, which in turn necessitates careful process monitoring, including frequent and detailed inspections of the devices while they are still in the form of semiconductor wafers.

A conventional in-process monitoring technique employs a two phase "inspection and review" procedure. During the first phase the surface of the wafer is inspected at high-speed and relatively low-resolution. The purpose of the first phase is to produce a defect map showing suspected locations on the wafer having a high probability of a defect. During the second phase the suspected locations are more thoroughly analyzed. Both phases may be implemented by the same device, but this is not necessary.

The two phase inspection tool may have a single detector or multiple detectors. Multiple detector two phase inspection devices are described, by way of example, in U.S. Pat. Ser. Nos. 5,699,447, 5,982,921, and 6,178,257.

SUMMARY OF THE INVENTION

According to an aspect of the presently disclosed subject matter, a computerized method for estimating a size of a nanometric part of an inspected article, the method including: (a) acquiring inspection results generated by processing an inspection image which was generated by collecting signals arriving from a portion of the article which includes the part by an inspection system; (b) fitting to the inspection results an approximation function from a group of functions which is related to a response pattern of the inspection system; and (c) determining an estimated size of the part, based on at least one parameter of the approximation function.

Optionally, the part is a defected part of the article, and the article is selected from a group consisting of a wafer, a photomask, and an electric circuit.

Optionally, the group of functions consists of Gaussians.
Optionally, the group of functions consists of parabolas.
Optionally, the group of functions consists of convolutions of Gaussians and boxcar functions.

Optionally, for each selectable function of the group of functions there exists a corresponding function having an absolute maximum, so that for at least 90% of the possible inputs of the corresponding function within a standard deviation around the absolute maximum of the corresponding function, the deviation between the outcomes of the selectable function and of the respective corresponding function is less than 20%, wherein the corresponding function is either a Gaussian, a parabola, a convolution of a Gaussian and a boxcar, or a log of a convolution of a Gaussian and a boxcar.

Optionally, the fitting includes processing the inspection results for providing processed inspection results, and fitting the approximation function to the processed inspection results. [e.g. logging, explain giving weights to different parts]

Optionally, the determining includes normalizing the approximation function.

Optionally, the determining includes summing discrete values of the approximation function, and applying a correction function to the sum, wherein the estimated size of the part is determined based on the corrected sum.

Optionally, the fitting is based on values of the approximation function for a limited set of inputs, wherein the determining of the estimated size of the part is based on values of the approximation function for a set of inputs which includes inputs which are excluded from the limited set.

Optionally, the fitting is irrespective of saturated values in the inspection results.

Optionally, the method further includes measuring a beam profile of an inspection system, wherein the collected signal results from an interaction of an illumination beam of the inspection system and the portion of the article, and defining the group of functions based on a result of the measuring.

Optionally, the method further includes defining the group of functions based on a processing of collected signals arriving from a group of articles including at least one reference article other than the article.

According to an aspect of the presently disclosed subject matter, a computerized method for estimating a size of a nanometric part of an inspected article is disclosed, the method including: (a) acquiring inspection results generated by processing an inspection image which was generated by collecting signals arriving from a portion of the article which includes the part; (b) fitting to the inspection results an approximation function from a predefined group of functions; (c) summing values of the approximation function; (d) applying a correction function to the sum to provide a corrected sum; and (e) determining an estimated size of the part, based on the corrected sum.

According to an aspect of the presently disclosed subject matter, a system configured to estimate a size of a part of an article, the system including a tangible processor which includes: (a) a results acquisition module, configured to acquire inspection results generated by processing an inspection image which was generated by collecting signals arriving from a portion of the article which includes the part; (b) a fitting module configured to fit to the inspection results an approximation function from a group of functions which is related to a response pattern of the inspection system; and (c) a size estimation module, configured to determine an estimated size of the part, based on at least one parameter of the approximation function.

Optionally, the part is a defected part of the article, and the article is selected from a group consisting of a wafer, a photomask, and an electric circuit.

Optionally, the group of functions consists of Gaussians.

Optionally, the group of functions consists of parabolas.

Optionally, the group of functions consists of convolutions of Gaussians and boxcar functions.

Optionally, for each selectable function of the group of functions there exists a corresponding function having an absolute maximum, so that for at least 90% of the possible inputs of the corresponding function within a standard deviation around the absolute maximum of the corresponding function, the deviation between the outcomes of the selectable function and of the respective corresponding function is less than 20%, wherein the corresponding function is either a Gaussian, a parabola, a convolution of a Gaussian and a boxcar, or a log of a convolution of a Gaussian and a boxcar.

Optionally, the fitting module is configured to fit the approximation function to processed inspection results which are a result of a processing of the inspection results.

Optionally, the size estimation module is configured to determine the estimated size based on a normalization of the approximation function.

Optionally, the size estimation module is configured to sum discrete values of the approximation function, to apply a correction function to the sum, and to determine the estimated size of the part based on the corrected sum.

Optionally, the fitting module is configured to fit the approximation function to the inspection results irrespectively of saturated values in the inspection results.

According to an aspect of the presently disclosed subject matter, a program storage device readable by machine is disclosed, the program storage device tangibly embodying a program of instructions executable by the machine to perform method for estimating a size of a nanometric part of an inspected article, including the steps of: (a) acquiring inspection results generated by processing an inspection image which was generated by collecting signals arriving from a portion of the article which includes the part by an inspection system; (b) fitting to the inspection results an approximation function from a group of functions which is related to a response pattern of the inspection system; and (c) determining an estimated size of the part, based on at least one parameter of the approximation function.

Optionally, the part is a defected part of the article, and the article is selected from a group consisting of a wafer, a photomask, and an electric circuit.

Optionally, the group of functions consists of Gaussians.

Optionally, the group of functions consists of parabolas.

Optionally, the group of functions consists of convolutions of Gaussians and boxcar functions.

Optionally, for each selectable function of the group of functions there exists a corresponding function having an absolute maximum, so that for at least 90% of the possible inputs of the corresponding function within a standard deviation around the absolute maximum of the corresponding function, the deviation between the outcomes of the selectable function and of the respective corresponding function is less than 20%, wherein the corresponding function is either a Gaussian, a parabola, a convolution of a Gaussian and a boxcar, or a log of a convolution of a Gaussian and a boxcar.

Optionally, the fitting includes processing the inspection results for providing processed inspection results, and fitting the approximation function to the processed inspection results. [e.g. logging, explain giving weights to different parts]

Optionally, the determining includes normalizing the approximation function.

Optionally, the determining includes summing discrete values of the approximation function, and applying a correction function to the sum, wherein the estimated size of the part is determined based on the corrected sum.

Optionally, the fitting is based on values of the approximation function for a limited set of inputs, wherein the determining of the estimated size of the part is based on values of the approximation function for a set of inputs which includes inputs which are excluded from the limited set.

Optionally, the fitting is irrespective of saturated values in the inspection results.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 3 is a flow chart of a computerized method for estimating a size of a part of an article, in accordance with the presently disclosed subject matter;

Figure 1:
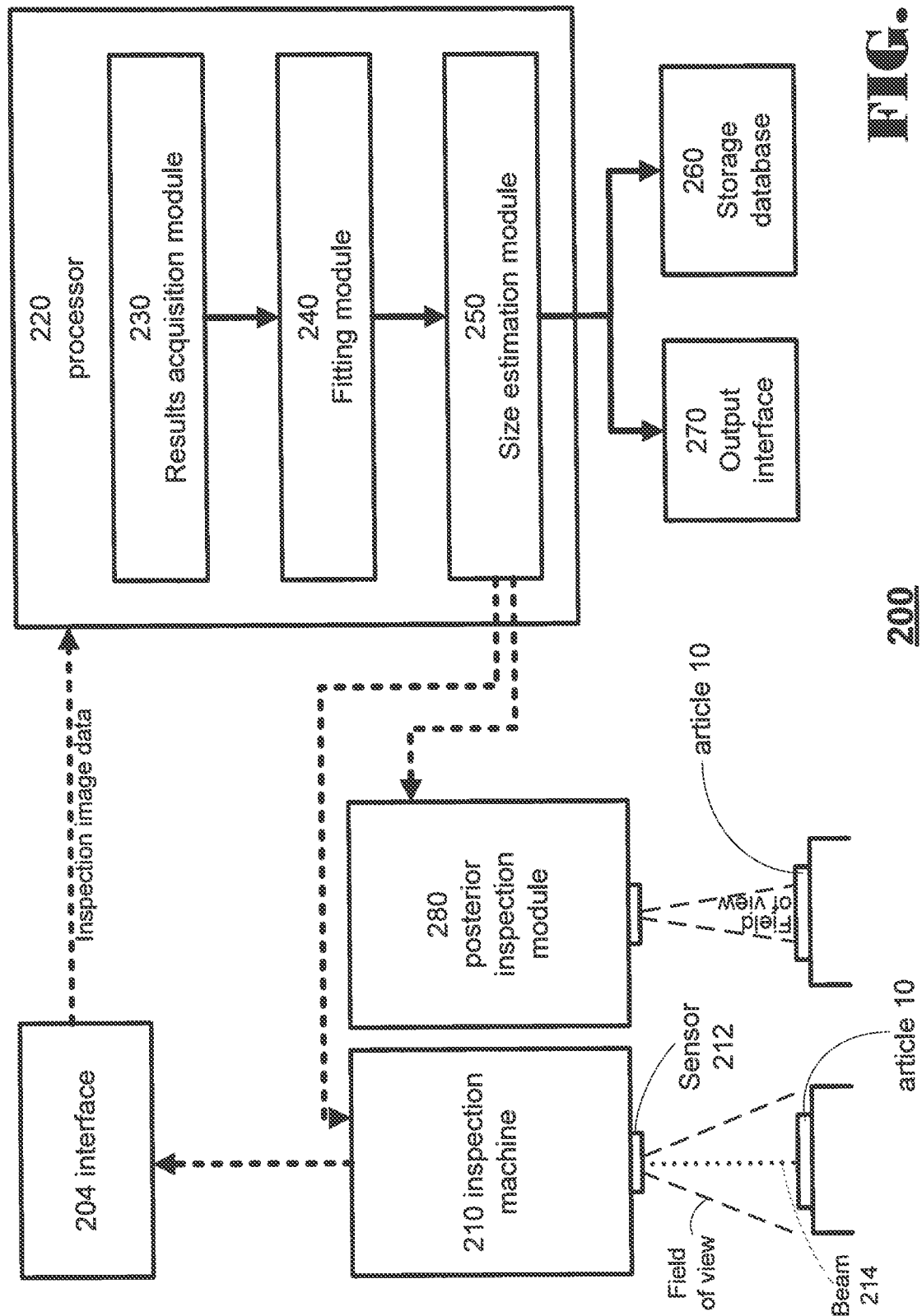
FIG. 1 is a block diagram of a system which is configured to estimate a size of a part of an article, in accordance with the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "processing", "calculating", "determining", "generating", "setting", "configuring", "selecting", "defining", "computing" or the like, include action and/or processes of a computer that manipulate and/or transform data into other data, said data represented as physical quantities, e.g. such as electronic quantities, and/or said data representing the physical objects. Terms such as "computer", "processor", "processing module", "processing unit" and the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter one or more stages illustrated in the figures may be executed in a different order and/or one or more groups of stages may be executed simultaneously and vice versa. The figures illustrate a general schematic of the system architecture in accordance the presently disclosed subject matter. Each module in the figures can be made up of any combination of software, hardware and/or firmware that performs the functions as defined and explained herein. The modules in the figures may be centralized in one location or dispersed over more than one location.

FIG. 1 is a block diagram of system 200 which is configured to estimate a size of a part of an article (such as article 10), in accordance with the presently disclosed subject matter. Especially, system 200 may be configured to estimate a size of a nanometric part of an inspected article (e.g. a defect on a wafer or a photomask, as discussed below).

System 200 includes at least tangible processor 220 that includes several modules which may be operated for size estimation, but may include additional components such as any combination of components 204, 210, 270, 280 and 290. Processor 220 includes several modules (which may be implemented in software, hardware, firmware, or any combinations of the above) which operate for processing inspection results which are based on an inspection image, to provide a size estimation of a part of an article which is imaged in that image. Before processor 220 is discussed in greater detail, however, the inspection system will be described in more detail. While not necessarily so, article 10 may be selected from a group consisting of an electronic circuit, a wafer, and a photomask.

System 200 may obtain the inspection image in many ways. For example, system 200 may be combined with an inspection machine 210 that is used to inspect the wafer or other types of articles (e.g. during different stages of manufacturing thereof). In another implementation system 200 may be connected to such an inspection machine, or the inspection image may be transmitted by an off-line device connected to only one of the machines at a time. Also, system 200 may be an inspection machine into which some or all of the modifications and/or features discussed below have been integrated.

The inspection system may be, for example, any out of the many detection tools which are known in the art such as having single detector, multiple detectors, dark field detectors, bright field detectors or any combination of detectors. Alumot system is a multi detector system but other multi-detector systems having other arrangement of detectors may be implemented.

The operation of system 200 and of the various components thereof may be better understood in view of the process of operation. Therefore, part of the description of system 200 will be provided after method 500 is discussed, and the description of system 200 preceding the discussion of method 500 is therefore partial.

Without limiting the scope of the invention in any way, in some possible implementations system 200 may be used for inspection tools in which an entire wafer or at least an entire die is scanned for detection of potential defects (such as the Elite and the UVision systems by Applied Materials, Inc.), and/or for review tools which are typically of higher resolution (e.g. a scanning electron microscope, SEM) which are used for ascertaining whether a potential defect is indeed a defect. Such review tools usually inspect fragments of a die, one at a time, in high resolution. Whenever the term "inspection" or its derivatives are used in this disclosure, such an inspection is not limited with respect to resolution or size of inspection area, and may be applied, by way of example, to review tools and to lower resolution wafer inspection tools alike.

While not necessarily so, the process of operation of system 200 may correspond to some or all of the stages of method 500. Likewise, method 500 and its possible implementations may possibly be implemented by a system such as system 200. It is therefore noted that variations of the invention discussed in relation to method 500 may also be implemented, mutatis mutandis, in a hardware counterpart as various embodiments of system 200, and vice versa.

It should be noted that, as will be clear to any person who is of skill in the art, wherever the term "wafer" is used—similar techniques, systems, methods and computer program products may be implemented for optical masks that are used for the manufacturing of wafers.

The term "defect" is very well known in the art, and should be construed in a non-limiting way as including (though not necessarily limited to) an undesirable local change that may kill the chip or affect its reliability.

It is noted that the term "pixel" is very well known in the art and should be construed in a non-limiting way as including (though not necessarily limited to) an element of an image which has a color value (e.g. a gray level value), and a defined location within the image (e.g. integer x and y coordinates). The location of the pixel with respect to the image of which it is a part is relative to a location of the article imaged in the respective image.

The scanning of the article 10 may be implemented by any scanning, imaging and/or detecting apparatus, many of which are known in the art. Such an apparatus (denoted "sensor 212") may be part of system 200, but this is not necessarily so and the two may or may not be directly connected. By way of example, such an apparatus may be a scanning electron microscope, an optical inspection system and so forth.

By way of example, a wafer 10 (or several wafers, or one or more articles of another type) may be placed on a movable stage. In such an implementation, article 10 remains stationary with respect to the movable stage during the scanning of the article, and the respective movement between the article 10 and sensor 212 (if required to image different parts of the article) is achieved by controllably moving the movable stage. For example, the movable stage may be moved along an X-axis, a Y-axis, and possibly also a Z-axis direction (wherein the X and Y axes are perpendicular axes on the surface plane of the movable stage, and the Z-axis is perpendicular to both of those axes). Alternatively (or in addition), sensor 212 may change a position in order to image different parts of article 10.

In inspection machine 210, a portion of article 10 is illuminated by a beam 214 transmitted by illumination module (in the illustrated example, the illumination module is combined in a co-axial way with sensor 212). Such a beam 214 may be a beam of light (e.g. visible light, infrared light, ultraviolet light, and so on, e.g. a laser), a beam of another kind of electromagnetic radiation (e.g. radio waves, microwaves, X-rays, Gamma rays, etc.), a beam of particles (e.g. a beam of electrons), and so on.

The illumination beam 214 interacts with the portion of article 10, and outgoing signals which are a result of such interaction may then be captured by one or more sensors 212. Different types of such interactions may occur when the illumination beam meets the article. For example, parts of the illumination beam may be reflected towards such a sensor 212, parts of the illumination beam may be deflected towards such a sensor 212, parts of the illumination beam may be diffracted towards such a sensor 212, parts of the illumination may result in emission of another type of radiation/particles towards such a sensor, and so on. For the sake of simplicity, only one sensor 212 is illustrated, which captures reflected signals from the article 10.

The image which is created on a surface of the sensor 212 by the reflected signals depends on various factors. Some of the most essential factors which affect the created image are: the characteristics of the illumination beam, the modifications which the illumination beam undergo before hitting the article, the way the article (or at least the illuminated portion thereof) interacts with such illumination, the modifications which the resulting outgoing signals undergo before hitting the sensor 212, and the way such signals are modified and then recorded by the sensor 212.

The illumination beam 214 may be characterized by various factors such as: beam width, beam quality, beam divergence, beam profile (i.e. the 1D or 2D intensity plot of a beam at a given location along the beam path), beam astigmatism, beam jitter and other modifications in time, and so on. It is noted that when the term beam profile is used below, any combination of one or more of the other characteristics from the above list may also be implemented, in addition or instead of the beam profile. For example, the beam profile of laser beams is commonly approximated as a Gaussian or as a flat-top profile.

Modification which the beam undergoes between the illumination source and the article (e.g., by optical devices such as lenses, mirrors, etc., by media such as air, intermediate electromagnetic field, etc., and so on) may be characterized by matching transmission function (or functions).

The modifications which the outgoing signals experienced in the sensor before (and during) the recording thereof may be described by a respective transfer function (or functions). Especially, transfer functions of optical sensors may be optical transfer function (OTF) and modulation transfer function (MTF, which describes the magnitude component of the OTF).

The interaction between the illumination beam (possibly after being transformed in its way towards the article) and the illuminated portion of the article depends on several factors. Such factors may include, for example: characteristics of the ingoing signals (e.g., beam profile etc.), the material (or materials) which the portion is made of and its characteristics (e.g. transmission coefficient), the shape of the portion, and so on.

Figure 2A:
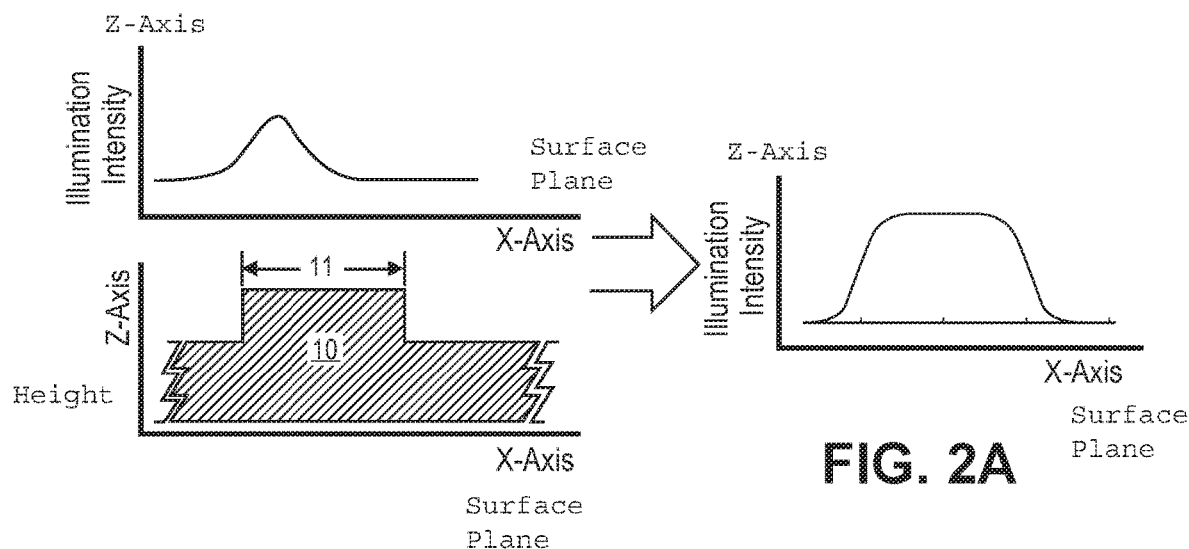
FIGS. 2A and 2B are cross section views of several kinds of articles in accordance with the presently disclosed subject matter.
Figure 2B:
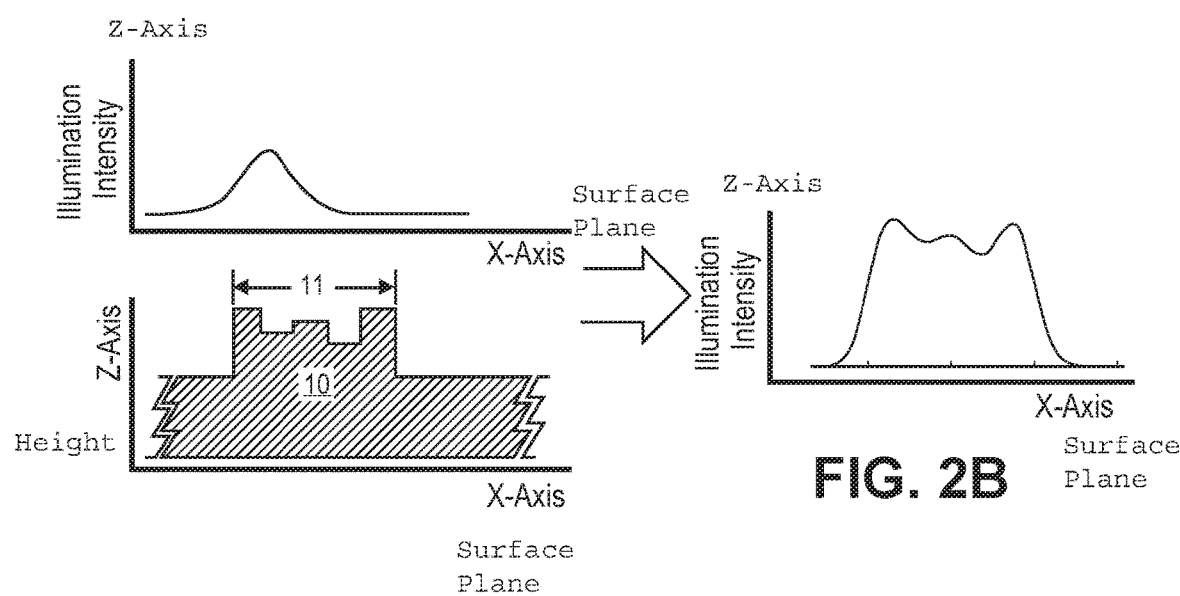

FIGS. 2A and 2B are cross section views of several kinds of articles 10 in accordance with the presently disclosed subject matter. Each of the articles illustrated in FIGS. 2A and 2B has a distinct part (denoted 11) which is different than the area surrounding the distinct part (herein after also referred to as the background area). For simplicity of illustration, the distinct part 11 in each of the articles 10 differ from the background area only in its height (along the Z axis). However, in other articles the part 11 may differ from its background in various other parameters as well, such as color, reflexivity, transmission coefficient, diffraction coefficient, scattering, electric conductivity, thermal conductivity, and so on.

The cross section of the illumination beam 214 in each of FIGS. 2A and 2B is identical, in order to show how different surfaces react to the same illumination. It is also assumed that the illumination beam moves uniformly along the x-axis when inspecting the respective article 10.

The right graph in each of FIGS. 2A and 2B illustrates the outcome image resulting from the illumination of the respective article 10 of the respective figure with the illustrated beam. The resulting images in these illustrations are convolutions of the illumination with the cross section of the respective article 10. Clearly, in real life measurements some noise and other errors may result in less neat results.

Figure 2C:
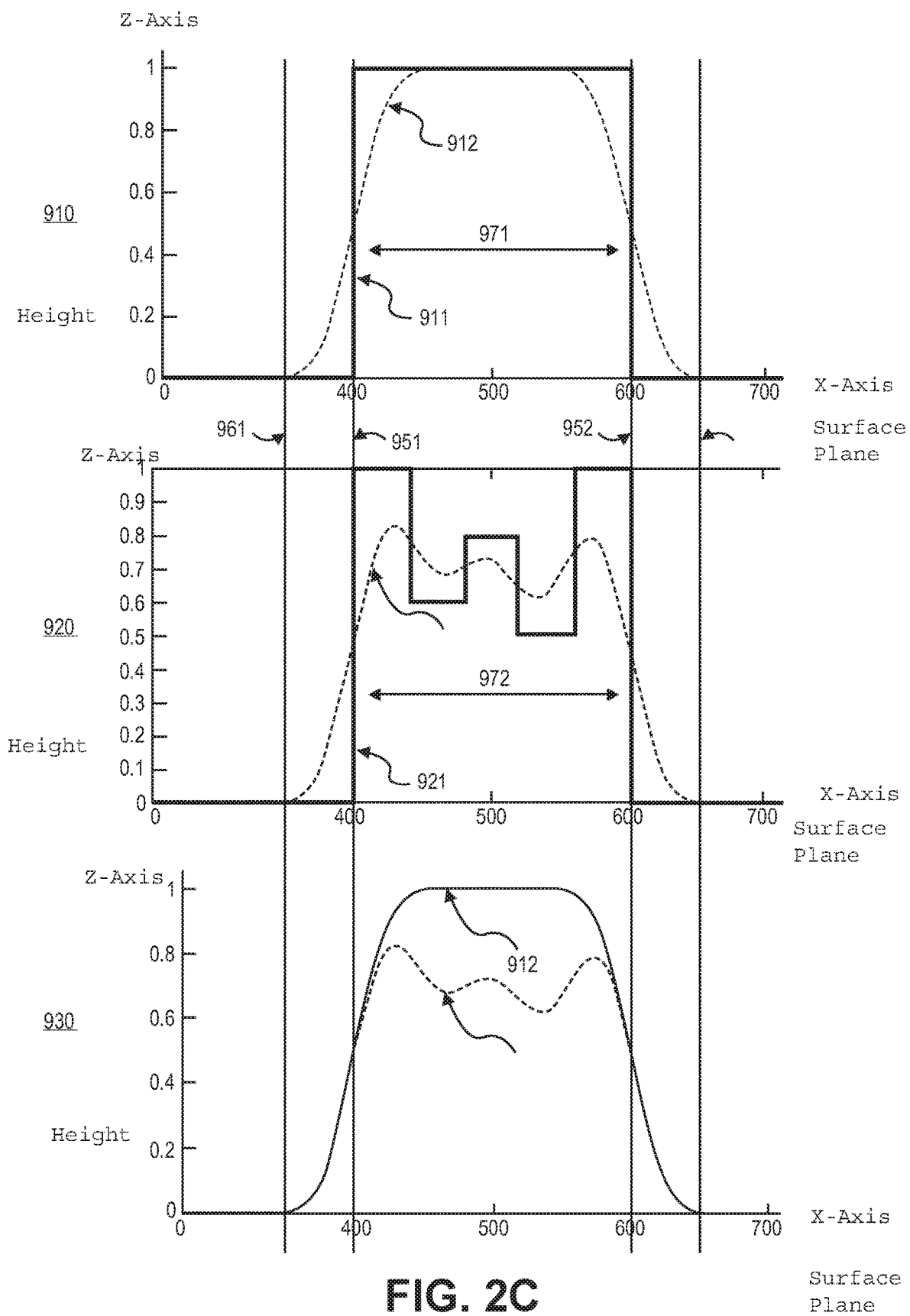
FIG. 2C illustrates the outcome images used in FIGS. 2A and 2B.

FIG. 2C illustrates the outcome images used in FIGS. 2A and 2B. Graph 910 refers to the example of FIG. 2A, graph 920 refers to the example of FIG. 2B, and graph 920 refers to both. In graph 910, curve 911 refers to the partial cross section of the respective article 10, and curve 912 refers to the outcome image. In graph 920, curve 921 refers to the partial cross section of the respective article 10, and curve 922 refers to the outcome image. In graph 930 the two curves 912 and 922 are compared. Lines 951, 952, 961 and 962 are offered in order to each the comparison between the graphs.

As can be seen in FIG. 2C, the characteristic widths 971 and 972 of the higher-than-average parts of the resulting images are relatively similar (it is noted that the widths of the parts 11 illustrated are similar). That is, the width of the imaged part in the image corresponds to the width of the part 11 on the article, and in at least some of the possible articles 10—the actual shape of the surface of the respective part 11 has secondary effect when compared to the width of the part.

As aforementioned, some of the ways in which system 200 and its components—especially the modules of processor 220—may operate are discussed in greater detail with respect to method 500.

FIG. 3 is a flow chart of computerized method 500 for estimating a size of a part of an article, in accordance with the presently disclosed subject matter. Especially, method 500 may be used for estimating a size of a nanometric part of an inspected article, e.g. as discussed below with respect to wafers and masks.

Referring to the examples set forth in the previous drawings, method 500 may be carried out by system 200. Different embodiments of system 200 may implement the various disclosed variations of method 500 even if not explicitly elaborated. Likewise, different embodiments of method 500 may include stages whose execution fulfills the various disclosed variations of system 200, even if succinctness and clarity of description did not necessitate such repetition.

Method 500 may be implemented for various types of articles, from a very minute scale (e g millimetric or nanoscale objects) to larger objects such as geographical area imaged from an airplane or from a satellite.

In order to clarify the disclosure, different stages of method 500 would be exemplified using an example of an article which is selected from a group consisting of an electronic circuit, a wafer, and a photomask (a partially transparent plate which may be used for the manufacturing of electronic circuits or other objects in a process implementing transmitting light through such a photomask, such as photolithography).

It is noted that method 500 may be used for estimating sizes of different kinds of parts within articles. For example, the method may be used for estimating a size of defects (of various kinds) in wafers or photomask, for determining sizes of holes in textile, size of vehicles detected by radar, and so on. Method 500 is especially useful when the part of the article whose size is estimated and the width of the illumination beam when hitting the article are of similar width (e.g., one is not larger than the other by more than 1000%), or when a characteristic width of the impulse response of the article in a given illumination (of the part and/or of the background) is of similar width to that of the part (e.g., one is not larger than the other by more than 1000%).

The part of the article whose size is estimated has different interaction with the illumination beam than the interaction of its background with such beam, but the difference may take different forms. For example, this part (hereinafter also referred to as "the estimated part") may reflect, diffract and/or deflect more (or less) of the impacting illumination, its pattern of reflection, diffraction and/or deflection may differ than that of its background, its magnitude and/or pattern of emission as a result of the illumination may be different, and so on. Such differences may result from a wide range of physical differences that may occur between such part and its surrounding, such as topography, color, electric conductivity, thermal conductivity, and so on.

Such differences may also occur in defects, even though not all defects shows such differences. For example, if an intended small hole or protuberance was not manufactured, the location of such intended object may be similar to its environment while nevertheless defective. However, other defects are different from their environment (e.g. a hole or a protuberance manufactured where they are not intended). In such cases, the estimated part of the article may be a detected defect (or at least a suspected defect, whose defectiveness is uncertain).

Method 500 may include the generation of an inspection image of the article (or at least of portion of it which includes the relevant estimated part). Even though such a stage of inspection image generation (if part of method 500) takes place before the processing of the inspection image for estimating the size of the part, it is described thereafter, for editorial reasons.

It is noted that the inspection image which is processed for estimating the size of the part of the article may be a selected fragment out of a larger preliminary inspection image which was generated by collecting signals arriving from a larger area of the inspected article (when compared to the area represented by the inspection image used for the size estimation).

For example, method 500 may include stage 511 of processing the preliminary inspection image for identifying a candidate part of the article for size estimation. If the part of the article whose size is to be estimated is, for example, a defect, than the identification of the candidate part of the article may include implementing a defect detection algorithm, many of which are known in the art (e.g., as disclosed in previous Applied Materials patents and patent applications). Such defect detection algorithm may include, for example, comparing the inspection image to a reference image (whether inspection image or CAD based) or comparing different parts of the inspection image to each other, and analyzing the differences between such images for detection of defects. If the candidate part of the article is an object whose background is uniform (e.g. a cat on a white mat, a bug on a blue rug, an intruder in a security camera image from which the "still" regular image has been subtracted, etc.), than image processing algorithms such as subtracting the uniform color from each pixel and looking for pixels whose new color exceeds a threshold may be implemented.

Method 500 may also include stage 512 determining the inspection image which will be analyzed in order to estimate the size of the part, by processing the preliminary inspection image (or, in some cases, by determining to refrain from processing thereof). The determining of stage 512 may include simply cropping the preliminary inspection image around the representation of the candidate part (wherein the size of the cropped part may be determined based on the characteristics of the candidate part and/or of its background, and may also be predetermined), but other image processing processes may also be implemented (e.g. by changing a contrast, hue, etc. of the inspection image or of parts thereof).

Stage 520 of method 500 includes acquiring inspection results generated by processing an inspection image which was generated by collecting signals arriving from a portion of the article which includes the part. Stage 520 may include the processing itself, but the results may also be obtained from an external unit. If stage 530 includes the processing, it may include processing the inspection image (which was generated by collecting signals arriving from a portion of the article which includes the part) for acquiring the inspection results. Referring to the examples set forth with respect to the previous drawings, stage 520 may be carried out by a results acquisition module such as results acquisition module 230. The type of processing executed in stage 520 depends on the type of inspection results used.

The inspection results may simply be an array of values, each value corresponding to an inspected value (e.g. color) of a respective pixel of the inspection image. Such values of the array may be scalar values (e.g. gray-level or intensity levels) or vector values (e.g. an (R,G,B) color triplet). The value of each element of the array may be equal to the inspected value of the corresponding pixel (or multiple pixels, as discussed below, e.g. as an average thereof), but additional processing may also be implemented (e.g. for normalizing, etc.).

It is noted that the array may also be generated so that each of its values would correspond to inspected values of multiple pixels of a subgroup of the pixels of the inspection image. For example, such subgroup may be an M by N pixels subgroup. If M or N is equal to one, than the subgroup is a row, a column, a part of a row, or a part of a pixel. If M is equal to N than the subgroup is a square of pixels. It is noted that non-integer M and/or N may also be implemented (e.g. by applying weighted averages). The subgroups of pixels may also be generated by selecting for each subgroup a one-dimensional cross section of the inspection image (e.g., a diagonal cross-section of the inspection image), by an unidimensional projection of the multi-dimensional data of the inspection image (e.g. a projection the x and y axes of the image of the maximal gray-level (GL) of the pixels in a given column or height). The subgroups to which the elements of array correspond may be restricted to non-overlapping subgroups, but this is not necessarily so. The subgroups of pixels (or individual pixels) to which the values of the array correspond may include (when combined) all of the pixels of the inspection image, but this is not necessarily so). It is noted that an unidimensional, bidimensinoal or multidimensional array is not the only form in which the inspection results may be generated or stored. For simplicity of explanation, such a representation of the inspection result will be used as an example in the following discussion.

Stage 520 may include stage 521 of processing the inspection image to provide an array of values, wherein each value of the array is determined based on the inspected values of a row (or a column) of pixels of the inspection image. The processing of stage 521 may include, for example, summing the respective inspected values, averaging the respective inspected values (either weighted or non-weighted averaging), etc.

Stage 530 of method 500 includes fitting to the inspection results an approximation function from a group of functions. Referring to the examples set forth with respect to the previous drawings, stage 530 may be carried out by a fitting module such as fitting module 240.

The group of functions (also referred to as "family of functions) may be related to a response pattern of the inspection system. As mentioned above, the response pattern may depend on various factors, such as: beam profile, changes the beam undergo before hitting the article (described by a respective transmission function), the interaction characteristics of the article (e.g. described by a respective impulse response function), changes which the refracted/deflected beam undergo before reaching the sensor (described by a respective transmission function), and the way such outgoing signals are modified and then recorded by the sensor (e.g. described by a respective transfer function such as OTF or MTF). The group of functions may be related to any one or more of these factors.

For example, the fitting may include finding a function out of the family of functions whose values for predetermined discrete inputs (if the inspection results are indeed discrete, i.e., correspond to pixels and not to continuous inspection results) most closely resemble the inspection results. While not necessarily so, the family of functions may include functions which differ only by the values of a finite set of parameters. By way of example, the functions of family of one dimensional Gaussian distributions all conform to the form $$f(x) = ae^{-\frac{(x-b)^2}{2c^2}},$$

wherein the parameters a, b, and c may receive different real values. The fitting of the approximation function to the inspection results may include determining the values of such finite set of parameters (e.g., a, b, and c in the above example).

This may be done, for example, by finding the set of values which minimizes an error estimation function such as Minimum Least Square Error, MLSE. This method minimizes the sum of squared vertical distances between the inspection results in the dataset and the responses predicted by the approximation function. For example, for each row Ri in the inspection results, the corresponding value Iactual,Ri of the inspection results may be subtracted from the estimation of a suggested estimation function Fj for that row, Iestimation(Fj),Ri. The results (Iestimation(Fj),Ri-Iactual, Ri) may be squared for each i, and then summed to each other. That is, the score for each suggested estimation function Fj would be Σ(Iestimation(Fj),Ri-Iactual,Ri)2 for all i. The function Fj having the minimal score would be selected in such an implementation. It will be clear to a person who is skilled in the art that not all possible functions are necessarily analyzed for each set of inspection results, and that various techniques are known in the art for fitting a function to a set of results.

Various groups of functions may be used, and the actual group of functions implemented may be determined by measurements of the inspection system (e.g., by measuring the beam profile) or irrespectively thereof (e.g., by selecting a set of functions which is often used for approximation, such as normal distribution). For example, the group of functions may consist of Gaussians.

While according to group theory, the group which consist of Gaussians is included in an infinity of larger groups, and therefore "fitting to the inspection results an approximation function from a group of Gaussian functions" may also be implemented as "fitting to the inspection results an approximation function from such a larger group which includes the group of Gaussian functions". However, if no functions other than Gaussians are selected during normal execution of the stage of fitting (and especially if no other functions other than Gaussians are considered during normal execution of the stage of fitting), than the group of functions is considered to consist of Gaussians. Such functions which may be selected during normal execution of the stage of fitting are also referred to as "selectable functions". This usage of group of functions consisting one or more defined sets of functions is also used below.

Stage 540 of method 500 includes determining an estimated size of the part of the article, based on at least one parameter of the approximation function. Any parameter of these at least one parameter may be one of the parameters used to define and/or to select the approximation function (e.g. one of the above mentioned parameters a, b, and c of the family of Gaussian distributions), but may also be another parameter which may be derived by an analysis of the approximation function (e.g. its maximum value, the input giving such maximum value, its maximal derivative, etc.), or even an output of a function to which one or more such parameters serves as input. For example, an operator may be applied to the function to provide another function, whose parameter is used as a basis for estimating the size of the part of the article. Referring to the examples set forth with respect to the previous drawings, stage 540 may be carried out by a size estimation module such as size estimation module 250.

Stage 540 may include determining the estimated size of the part of the article based on one or more parameters indicative of a width of a part of the function whose values are higher than a threshold value.

Figure 4:
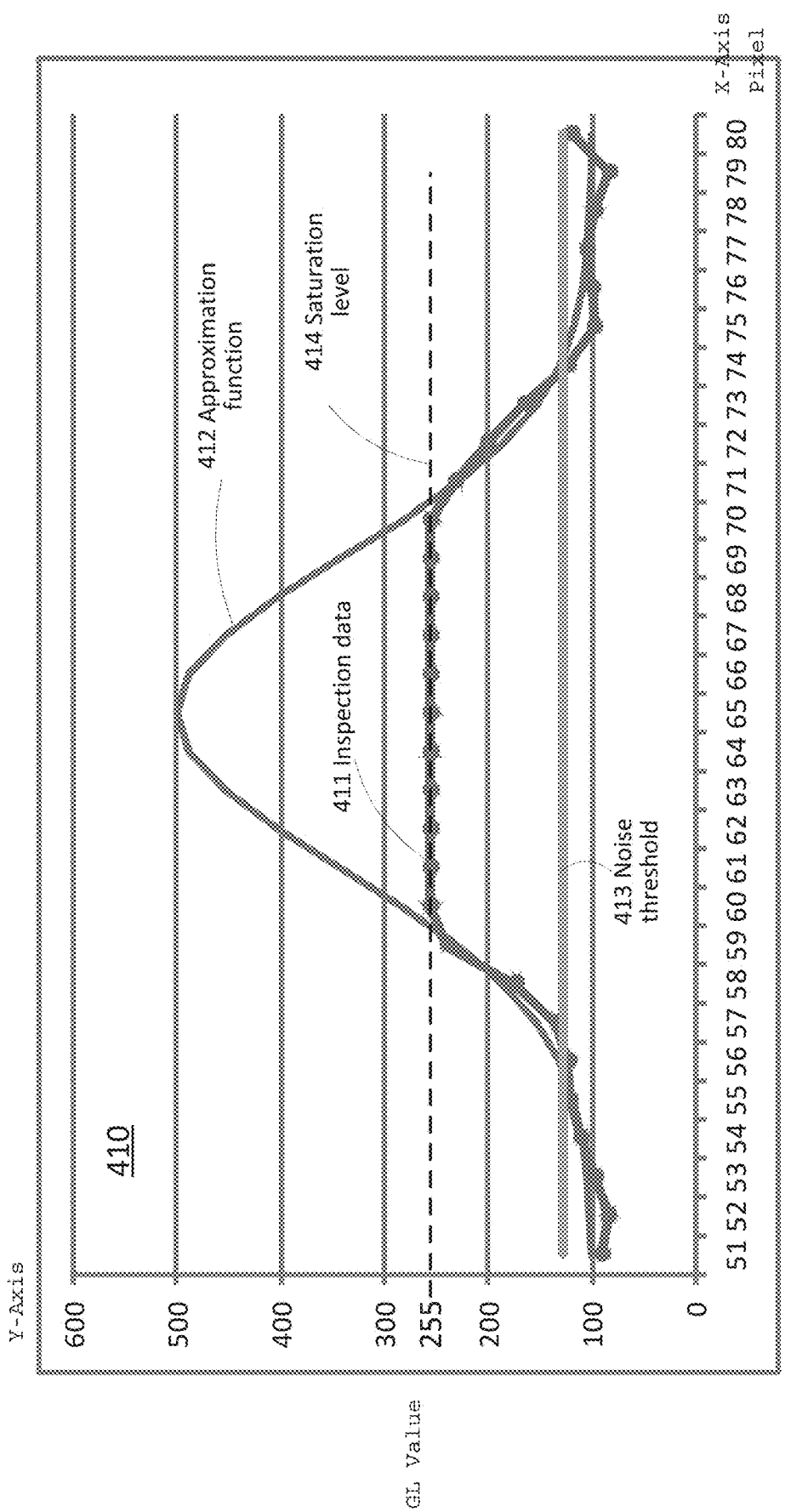
FIG. 4 is a graph on which are illustrated: unidimensional inspection results, and approximation function selected out of the family of Gaussian distributions according to a MLSE criterion.

FIG. 4 is a graph 410, on which are illustrated: unidimensional inspection results (line 411), and approximation function (line 412) selected out of the family of Gaussian distributions according to a MLSE criterion. According to the illustrated example, the inspected value (in this case, the gray level values—GL values) of the inspection results are indicated in integer numbers between 0 and 255. As can be seen, and as discussed below in more detail, in the illustrated examples all of the pixels between Pixels #60 and #70 are saturated, and receive the maximal GL (in this case—255), because of the limitations of the system. The fitting of the approximation function to the inspection results in this example is executed irrespectively of information of saturated pixels. The inspection results and the fitting functions are represented as continuous graphs, but it is noted that in many inspection systems the inspection results are obtained in a discrete manner (e.g. in pixel information), and that the fitting may be done on a discrete basis, as discussed above.

In the illustration, the base-level illumination level (that of the environment of the estimated part) is assumed to be GL=100. Reverting to FIG. 3, and to stage 540, stage 540 may include determining the estimated size of the part of the article based on one or more parameter indicative of a width of a part of the function whose values are higher than the background illumination level (in this case GL=100). In the illustrated example, the noise level of the inspection process prevents usage of GL below a higher threshold—in this case GL of 128 (denoted noise threshold, line 413). As will be seen later, even though inspected vales lower than this threshold (in this case 128) may be ignored during the fitting of stage 530, the utilization of the approximation function in the estimating of the size of the part may enable taking into account lower values. The estimating of the size of the part may be regarded as estimating a width (or pixel-size) of the deviation of illumination values from the base-level of the environment (or alternatively from the noise level, or from a level between these two ends), a deviation which results from the part of the article.

It is noted that optionally, the fitting of stage 530 is based on values of the approximation function for a limited set of inputs (e.g. these whose corresponding values are higher than the noise threshold), while the determining of the estimated size of the part (in stage 540) is based on values of the approximation function for a set of inputs which includes inputs which are excluded from the limited set (e.g. inputs whose corresponding values are lower than the noise threshold). This is also referred to as edge completion.

Figure 5:
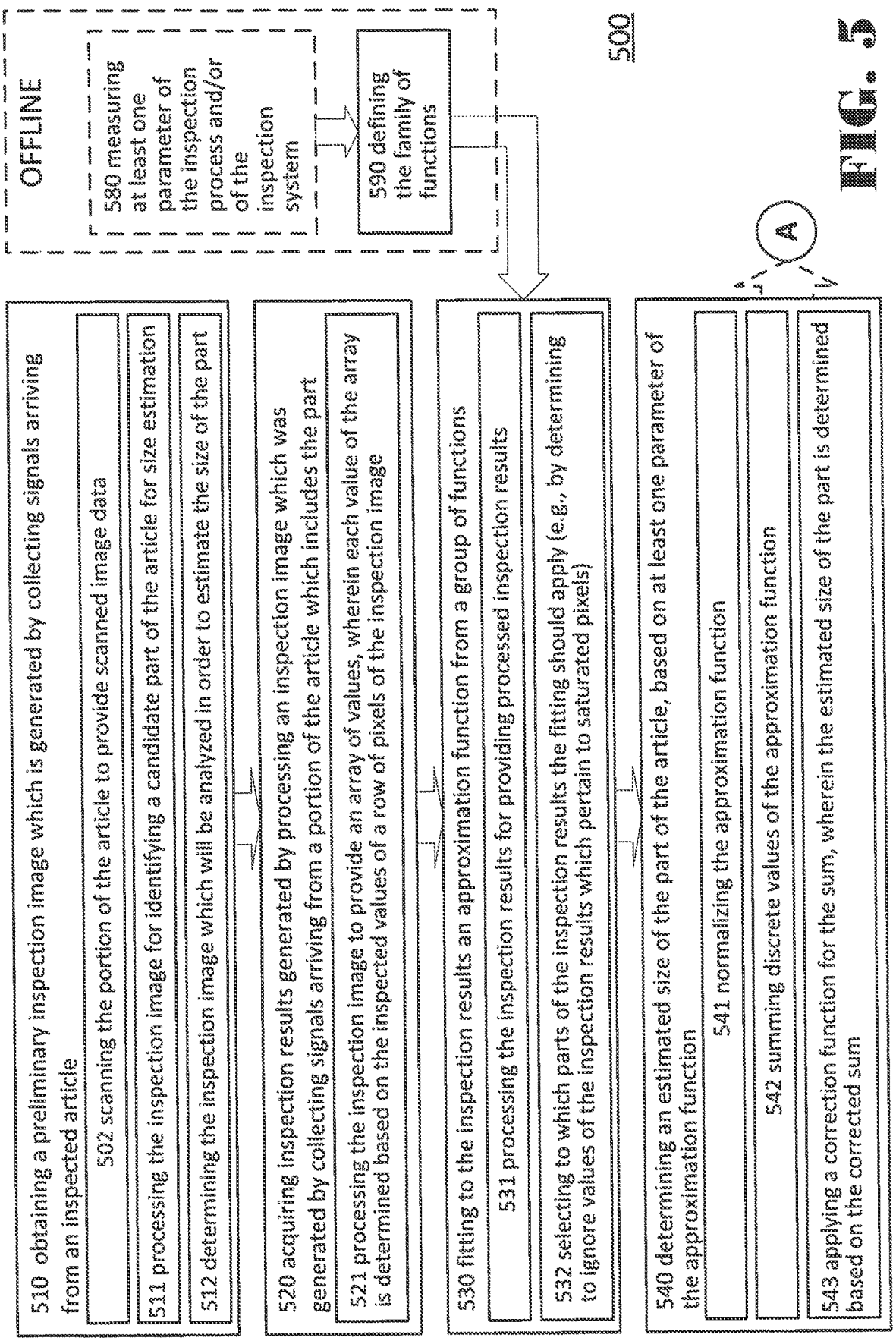
FIG. 5 is a flow chart of a computerized method for estimating a size of a part of an article, in accordance with the presently disclosed subject matter.

Further discussion of stages 510-540 is provided with respect to FIG. 5. Before that, some of the ways in which the estimation of the size may be utilized are discussed.

Optional stage 550 of method 500 includes determining a presence of a defect in the part, based on the estimated size (and possibly on other parameters associated with its representation in the inspection image or in other inspection image, such as variance, etc.). For example, the determining of the presence of the defect may be based on a comparison of the estimated size to a threshold level. Referring to the examples set forth with respect to the previous drawings, stage 550 may be carried out by a processor such as processor 220 (e.g., by a defect detection module thereof).

It is noted that the determining of the presence of a defect in the part of the article may be a binary determination (i.e. present or non-present, defected or non-defected, and so on), but this is not necessarily so. Optionally, the determining of the presence of a defect may use a defect-indicative classification system which has more than two classes (i.e. more than just the classes of "having a possible defect" and "not having a possible defect").

Stage 550 may be followed by optional stage 560 of providing detection results which are based on a result of the determination of stage 550. The detection results may be provided is various ways (e.g. using a display, a communication interface, and so forth), and to one or more targets (e.g. to a human, to another system, and so forth). Referring to the examples set forth with respect to the previous drawings, stage 560 may be carried out by an output interface such as output interface 270.

The reporting may include reporting location information and/or size estimation information of the part (e.g. of the defect, if applicable) in pixel coordinates, in coordinates of the inspected article, in coordinates of a corresponding CAD design data, etc.

The results provided may further include additional information of the part which were identified within the inspection image, such as one or more of the following (e.g. as a part of a defect list):

Location information;

Estimated size information, indicating the estimate size;

Type information, identifying initial classification of the part of the defect;

An image excerpts of the inspection image, which includes an image of the part;

Grade of the part in one or more grading systems (e.g. indication of the likelihood of defectiveness of the indicated potential defect).

Method 500 may further include optional stage 570 of selectively applying one or more industrial processes in response to a result of the estimation of the size (e.g. as a result of the determination of the presence of the defect in stage 550). Clearly, in different embodiments of the invention, different industrial processes may be applied. For example, stage 570 may include applying any combination of one or more of the following industrial processes:

A production industrial process (e.g. further examining the inspected object, discarding the inspected article and/or another item, selecting a process which the article needs to undergo, etc.);

A chemical industrial process (e.g. applying to the inspected article an chemical material whose concentration is selected and/or manipulated based on the results of stage 550, etc.);

A mechanical industrial process (e.g. applying mechanical force onto the inspected article, etc.);

An information technology industrial process (e.g. writing information to a database and/or tangible storage, modifying communication routing channel, encrypting, etc.);

Method 500 may also continue with other actions that are based on the estimated size. For example, stage 570 may include selectively scanning areas of the article in a resolution higher than the resolution of the inspection image, based on a result of stage 550. In such a case, further scanning may be determined upon based on the estimated size of the article. Referring to the examples set forth in the previous drawings, such inspection may be carried out by an inspection machine such as inspection machine 210, or by a posterior inspection module (which may be another inspection machine), such as posterior inspection module 280. For example, if the inspected article is indeed a wafer, the inspection image may be obtained using Electron Beam Inspection (EBI) in a first resolution, while the potential defect identified based on the size estimation may be further inspected in much higher resolution by a Defect Review Scanning Electron Microscope (DRSEM). Stage 570 may also include declaring the wafer (or specific dies thereof) as operational or nonoperational based on the results of stage 550 and/or the results of stage 570 (e.g. the high resolution inspection).

Analyzing, utilizing and/or processing only part of the article whose size qualify under some criterion (e.g. for which a presence of a defect was determined in stage 550), but not other parts of the article saves time and resources, and may also improve the results of the inspection. For example, scanning less areas of the wafer would lead to less accumulation of electrical charge resulting from the electrons beamed by the electron beam scanning apparatus.

FIG. 5 is a flow chart of computerized method 500 for estimating a size of a part of an article, in accordance with the presently disclosed subject matter. The stages which are illustrated in FIG. 5 but not in FIG. 3 are optional, and the different possible combinations of those stages and of the stages discussed with reference to FIG. 3 may be implemented in different implementations of the invention.

Method 500 may include stage 502 of scanning the portion of the article (e.g. of the wafer) to provide scanned image data. The scanning of that portion may be a part of larger scanned part of the article—e.g. a die, multiple dies, or even the entire wafer (or at least the parts of which that include electronic circuit parts). The scanning may be carried out in different techniques such as electron beam scanning and optical scanning. Referring to the examples set forth in the previous drawings, stage 502 may be carried out by any scanning, imaging and/or detecting apparatus such as inspection machine 210. The scanning of stage 502 may include collecting the signals arriving from the article, and possibly also the sending of incident signals (also referred to as the illumination beam) which results in at least some of the signals arriving from the article.

An implementation of the scanning of stage 502 for scanning a wafer may include, for example, the following substeps: (a) illuminating an inspected die; (b) receiving detection signals by at least one detector; (c) processing the detection signals to provide an image of a portion of the illuminated die, the image includes a grid of pixels, each characterized by a signal such as a gray level signal; and optionally (d) selecting which pixel out of the grid of pixels to currently process, said pixel being the selected pixel. The selection may follow a predefined pattern, such as a raster scan pattern, but other selection schemes may be implemented.

For example, the inspection machine may illuminate with a laser beam different parts of the article in different times, and an optical sensor may measure radiation reflected from the wafer as a result of the reflection of the laser beam. The laser light (whether the incidence beam and/or the reflection) may be manipulated in some way for detecting only parts thereof (e.g. in dark-field microscopy, etc.), or not so (e.g. in bright-field microscopy, etc.).

Since the scanning may be a lengthy process, some or all of the other stages (e.g. any one or more of stages 510 through 570) may be carried out at least partly concurrently with the scanning of one or more parts of the article, such as the scanning of the scanned area of the article in stage 502. Alternatively, stage 502 may entirely precede stage 520, and possibly other stages of method 500 (e.g. stages 530, 550, 560). The scanned image data (or part thereof) may be process in order to determine the inspection results in stage 520. The scanned image data and/or the inspection results may be stored in a database which is stored in a tangible memory, whether volatile (e.g. DRAM, SRAM) and/or non-volatile (e.g. Hard-drive, Flash memory).

Method 500 may further include additional stages that precede the optional scanning of the article in stage 502, such as wafer alignment and translation of the wafer so that the reference area may be scanned. The global alignment of the wafer (e.g. by aligning a stage on which the wafer is positioned) may be based, for example, on CAD data, using coarse anchor points from the design data. For example, coarse registration a single large target by the Applied Materials patented RGA algorithm may be implemented. The translation of the wafer may include translating the wafer to a position in which the reference die may be scanned. Alignment methods are known in the art. An illustration of a method for such an alignment is described in U.S. Pat. Nos. 5,699,447, 5,982,921 and 6,178,257B1 of Alumot. Another alignment method is described at U.S. Pat. No. 5,659,172 of Wagner.

The information required for successful execution of such preliminary stages may be retrieved from a previously determined recipe (or recipe parameters) and/or from a configuration file (referred to as "config") which does not pertain to a specific scan or to a specific layer of a wafer, but rather to a configuration of the scanning machine executed right after its manufacture (or at a later time, irrespective of any specific target to be scanned).

Method 500 may also include defining the family of functions, of which the approximation function may be selected. The defining of the family of functions may be done in response to measuring of the inspection system and/or of its inspection process.

As aforementioned, the collected signals (which are used in the generating of the inspection image) result from an interaction of an illumination beam of the inspection system and the portion of the article (which includes the estimated part).

Method 500 may include stage 580 of measuring at least one parameter of the inspection process and/or of the inspection system. Stage 580 would usually be executed before stage 520, and optionally may be carried off line. Method 500 may include for example measuring a beam profile of an illumination system (of the illumination beam or of the collected beam). Other parameters of the inspection system which may be measured and later used in the defining the family of functions include polarization, etc.

Method 500 may also include stage 590 of defining the family of functions. Stage 590 may be executed based on the results of stage 580, but this is not necessarily so. For example, Method 500 may include measuring the beam profile of the inspection system, and defining the group of functions based on a result of the measuring. Method 500 may also include defining the family of functions based on a processing of collected signals arriving from a group of articles comprising at least one reference article other than the article. Such reference articles may include, for example, parts of known dimensions (and possibly also of known geometry), and may be used to calibrate the system which executes method 500, by defining the family of functions according to the inspection results of the reference articles. It is noted that a combination of these two may also be used—measuring parameters of the inspection system and/or of the inspection process, and selecting a family of functions based on the results (for example, after concluding whether the illumination beam has a profile which resembles more a Gaussian distribution or a flat-top distribution, selecting one of these families as the family of functions, even though the measured result may vary to some extent from a theoretical Gaussian or a flat top distribution).

The defining of the family of functions may be executed based on the reaction of the inspection system to defect (e.g. based on the impulse response on the system, but possibly based on additional parameters such as typical shape of defects, etc.). The family of functions may thus correspond to the impulse response of the inspection system.

Some examples of families of functions which may be used:

- The group of functions may consist of Gaussians. It is noted that in optics, a Gaussian beam is a beam of electromagnetic radiation whose transverse electric field and intensity (irradiance) distributions are well approximated by Gaussian functions. Many lasers emit beams that approximate a Gaussian profile, in which case the laser is said to be operating on the fundamental transverse mode, or "$TEM_{00}$ mode" of the laser's optical resonator. When refracted by a lens, a Gaussian beam is transformed into another Gaussian beam (characterized by a different set of parameters), which explains why it is a convenient, widespread model in laser optics.
- The group of functions may consist of parabolas (e.g. for fitting the approximation function to logs of the inspected values, as a log of a Gaussian distribution is a parabola).
- The group of functions may consist of convolutions of Gaussians and boxcar functions (or the logs of such convolutions).
- The group of functions may consist of convolutions of Gaussians and characteristic profile functions which resembles a cross-section of a characteristic inspected part (or the logs of such convolutions).
- The group of functions may consist of functions which resemble functions of any one or more of the above families. For example, for each selectable function of the group of functions there exists—in such an implementation—a corresponding function having an absolute maximum, so that for at least 90% of the possible inputs of the corresponding function within a standard deviation around the absolute maximum of the corresponding function, the deviation between the outcomes of the selectable function and of the respective corresponding function is less than 20%, wherein the corresponding function is either a Gaussian, a parabola, a convolution of a Gaussian and a boxcar, or a log of a convolution of a Gaussian and a boxcar.

Reverting to stage 520 of acquiring the inspection results, to stage 530 of fitting the approximation function to the inspection results, and to stage 540 of determining an estimated size of the part of the article based on the approximation function, it is noted that these stages may be implemented in various ways.

Optionally, the determining of the estimated size of the part of the article may be based on normalized data, and may therefore be irrespective of original inspected values (which in turn may be responsive to the original light intensities captured by the sensor). If normalizing is implemented, only the relationships between the different lighting intensities at different locations of the image matter, but not the absolute intensities. Referring to a graphical representation of the inspection results (e.g., line 411 of FIG. 4), only the shape of the inspection results matter, but not the dimensions (e.g., height) thereof. It is noted that linear normalizing may be implemented, but this is not necessarily so and non-linear normalization techniques may also be used.

The normalizing may be implemented before the fitting of the approximation function (i.e., normalizing the inspection results and then fitting the approximation function), after the fitting (i.e., normalizing the approximation function to provide a normalized approximation function), or on both occasions.

Optionally, method 500 may include stage 541 of normalizing the approximation function, wherein the determining of the estimated size is stage 540 is based on the normalized approximation function.

Method 500 may optionally include stage 531 (which may be a part of stage 530) of processing the inspection results for providing processed inspection results, wherein stage 530 includes fitting the approximation function to the processed inspection results.

For example, the processing of the inspection results may be executed for giving weights to different parts of the inspection results. Different weights may be given, for example, based on the magnitudes of the inspected values, e.g. for giving relatively smaller weights to large intensities and relatively higher weights to large intensities. This way, the errors based on which the error estimation function (e.g., MLSE) is based give more moderate weight to errors in large intensities.

For example, method 500 may include applying a logarithm operation (hereinafter also "log") to the inspected value to which the approximation functions function is fitted. It is noted that logging a Gaussian results in a parabola, and therefore the logged data may be fitted to a function selected from a family of parabolas. Accordingly, the families including the logs of some functions discussed above were also offered.

It is noted that stages 531 and 541 may be implemented for different needs. For example, stage 531 may include logging the inspection results (possibly after subtracting an average inspection value of the background), and stage 541 may include normalizing the approximation function.

Referring to FIG. 4, in the illustrated examples, all of the pixels between Pixels #60 and #70 are saturated, and receive the maximal GL (in this case—255, illustrated by line 414), because of the limitations of the sensor. However, if the sensor of the inspection system was capable of indicating higher illumination levels (and/or the inspection result processing module was capable of recording such levels), the inspection levels were closer to the Gaussian function illustrated (line 412). Therefore, optionally the fitting of the approximation function to the inspection results is implemented irrespectively of information of saturated pixels. Naturally, if not fitting the inspection results directly (e.g. alternatively fitting the logged values of which), the appropriate correction of overcoming saturation may be implemented. Optionally, method 500 may include stage 532 of selecting to which parts of the inspection results the fitting should apply. For example, stage 532 may include determining to ignore values of the inspection results which pertain to saturated pixels.

Optionally, the fitting of stage 530 is irrespective of saturated values in the inspection results (i.e., of values of the inspection results which pertain to saturated pixels).

In the illustration of FIG. 4, the base-level illumination level (that of the environment of the defect) is assumed to be 100. However, the noise level of the inspection process prevents usage of GL below a higher threshold—in this case GL of 128. As will be seen later, even though gray levels lower than this threshold (in this case 128) are not used in the fitting (because they are more affected by noise), the utilization of the fitted approximation function in the determining of the estimated size of the part may enable taking into account lower values (even subject to normalization/logging etc.).

Figure 6:
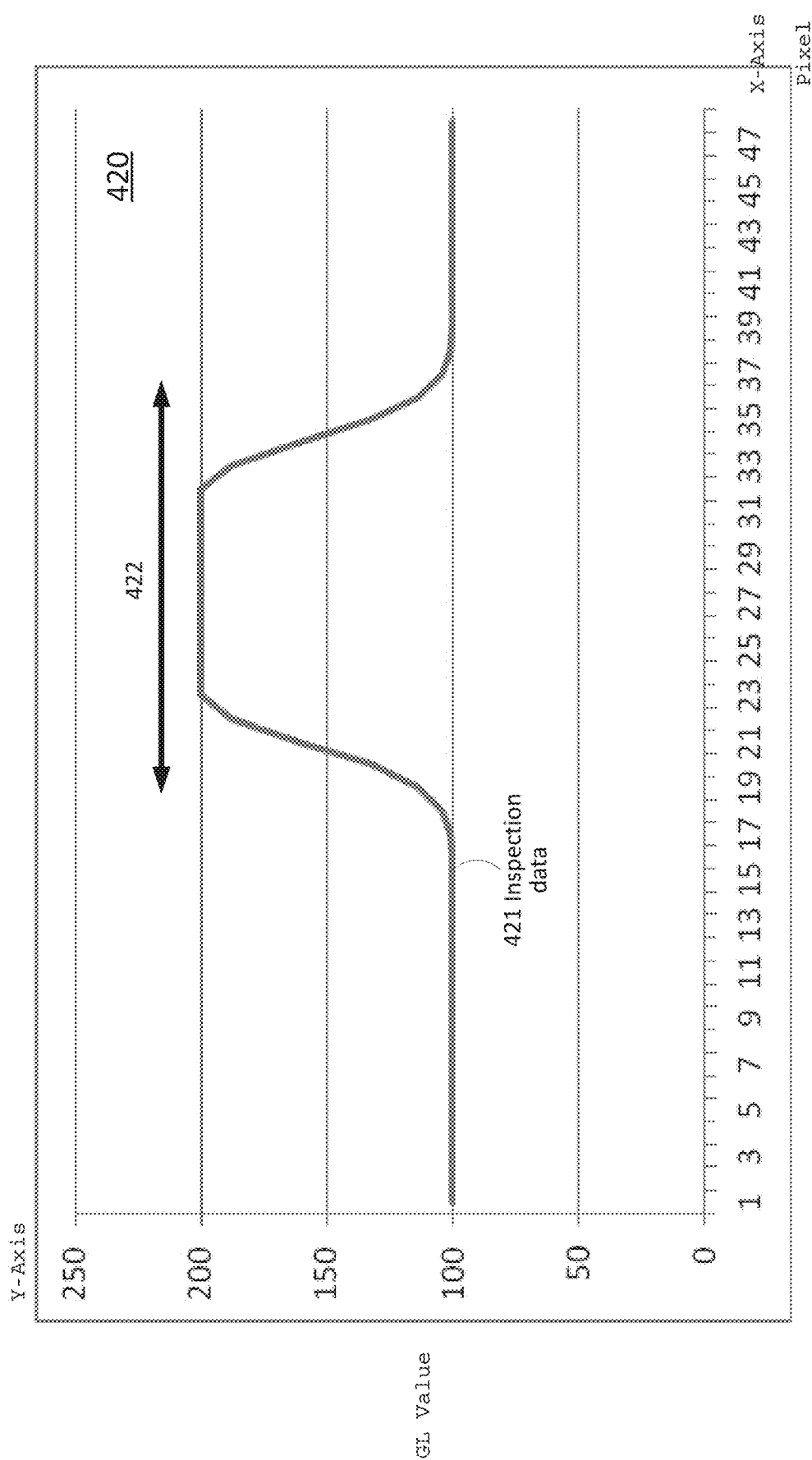
FIG. 6 is a graph which illustrates hypothetical inspection results which represent an inspection of a part of the article which is about two times as wide as the inspection laser beam, in accordance with the presently disclosed subject matter.

FIG. 6 is a graph 420 which illustrates hypothetical inspection results 421 which represent an inspection of a part of the article which is about two times as wide as the inspection laser beam, in accordance with the presently disclosed subject matter.

As can be seen, the inspection results 421 have a substantially flat top, whose size (denoted 422) is indicative of the size of the defect. The illustration is a continuous graph, but it is noted that in some inspection systems which may be used the inspection results are obtained in a discrete manner (e.g. as pixel information). It is noted that while the example above is illustrative only, and that defects are not normally an ideal boxcar function (as is assumed in the illustration, being a convolution of an assumed Gaussian beam with an assumed box-car like defect). However, it is noted that many a time, the dimensions (i.e., size) of the estimated part of the article has more affect on the width of the way that part is represented in the inspection results than the shape of the part (e.g., topography). This is also illustrated in FIGS. 2A, 2B, and 2C.

Finding the width of the deviation from the base level (e.g., 100 in the example of FIG. 4) may be implemented in different ways. Optionally, the determining of the estimated size may be implemented by summing the values of the normalized approximation function fitted to the inspection results. This may be implemented by determining the value of the function for each location (e.g. for each pixel) in the inspection results, subtracting the base-level value from each of these values, and dividing the result by the maximum value (out of the subtraction of the base level value from the approximation function values).

This way, the pixel with the maximal value is assigned a value of 1, pixels whose value is near the maximum value receive a fractional value which is near 1, and pixels with lower computed illumination levels (computed by the fitting function) receives lower values between 0 and 1. Summing all of these vales of the relevant pixels gives a number which is indicative of the number of pixels occupied by the defect. It is noted that in the determining of the estimated size, values which were ignored for the fitting (e.g., saturated values) may be used.

The determining of the estimated size of the estimated part may be regarded as estimating a width (or pixel-size) of the deviation of inspection values (e.g., illumination values, GL values) from the base-level of the environment, a deviation which results from the estimated part.

It is however noted that normalization is not necessarily implemented. For example, if some parameters regarding the inspected object are known (e.g. estimated defect shape, reflection coefficients etc.), not normalizing the reflected energy levels may enable utilizing reflected intensity levels in the determining of the size of the estimated part.

Optionally, stage 540 may include stage 542 of summing discrete values of the approximation function (whether the normalized or not), wherein the determining of the estimated size is based on the result of the summing. For example, stage 540 may also include stage 543 of applying a correction function to the sum, wherein the estimated size of the part is determined based on the corrected sum.

It should be noted that while the approximation function may be fitted to the inspection results only using the values which are above the noise level, the approximation function can be used for estimating the illumination levels below the noise level. Since the determining of the estimated size of the part is based on the approximation function (and not directly on the inspection data), pixels whose estimated values are lower than the noise level may also be counted in the sum. This may be implemented for normalized function or for non-normalized functions.

The summation gives a number which may be translated to a number of pixels. However, such summation may be an underestimate, an exact estimate, or an underestimate. Since the accuracy depends (among different factors) on size relationships between the inspection beam, the estimated size determined based on the result of stage 542 or 543 may be a results of a correction function F which offers correction based on the result of the summation. e.g., $$\text{Estimated size} = F\left( \sum_{P=1}^{\substack{N=number \\ of\_Pixels\_in \\ environment \\ of\_the\_defect}} \frac{\text{fit}(p)}{\max(\text{fit}(1)\ldots \text{fit}(n))} \right)$$

For example, F may be implemented as a look-up table (LUT). Since the error may be more distinguished in smaller estimated parts (e.g. whose size is smaller than the size of the beam, or similar thereto), it is noted that the correction function may introduce larger correction factor for smaller sums then to large ones. However, this is not necessarily so.

The herein proposed method may be used to determine sizes of estimated parts (e.g., defects) of different sizes—smaller or larger than a pixel, smaller or larger than a diameter of the inspection beam, etc. In some implementations, the proposed technique may be more accurate for smaller parts (e.g. defects smaller than a single pixel when imaged).

At least for the reasons states above, the herein proposed techniques are significantly less sensitive to the material and/or structure of the defect as well as to tool gain, when compared to prior art techniques.

Referring to method 500 as a whole, it is noted that while the approximation function may belong to a group of functions which is related to a response pattern of the inspection system, the group of functions may also be predefined otherwise (e.g. by selecting a group of functions which is easily computed and which gives sufficiently good results).

For example, method 500 may be implemented as a computerized method for estimating a size of the part of the article which includes the following stages:

- Acquiring inspection results generated by processing an inspection image which was generated by collecting signals arriving from a portion of the article which includes the part (thereby executing stage 520, possibly also including the processing itself);
- Fitting to the inspection results an approximation function from a predefined group of functions (thereby executing stage 530. This may include normalizing the approximation function, but not necessarily so);
- Summing values of the approximation function (thereby executing stage 542. The summed values may be discrete, but if the approximation function is continuous, integration may be used instead);
- Applying a correction function to the sum to provide a corrected sum (thereby executing stage 543); and
- Determining an estimated size of the part, based on the corrected sum (thereby continuing the execution of stage 540).

The other variations discussed with respect to method 500 may also be implemented for this variation thereof.

Referring to method 500 generally, it is noted that since method 500 is a computerized method, a program of instructions may be implemented, which, when executed by one or more processors, results in the execution of one of the aforementioned variations of method 500.

It would be clear to a person who is of skill in the art that instructions may be included in the program of instructions for executing some or all of the stages of method 500 (in all possible combinations suggested above), even if the inclusion of such instructions has not been explicitly elaborated.

Reverting to FIG. 1 in which system 200 is illustrated, it is noted that the operation of processor 220 may be more easily understood when viewed in light of method 500.

Tangible processor 220 includes results acquisition module 230, which is configured to acquire inspection results generated by processing an inspection image which was generated by collecting signals arriving from a portion of the article which includes the part. For example, the inspection image may be generated by inspection machine 210, and later processed by results acquisition module 230 to provide the inspection results. It is noted that optionally, the part is a defected part of the article, and the article is selected from a group consisting of a wafer, a photomask, and an electric circuit.

Alternatively, the processing of the inspection image to provide the inspection results may be executed by an intermediate unit operative between the inspection machine 210 and results acquisition module 230, or even by inspection machine 210.

Results acquisition module 230 may receive the inspection image and/or the inspection results (depending on where the processing of the inspection image is done) using one or more tangible interface 204 modules (e.g. over cable connection, or by one or more wireless connection devices).

Examples of ways in which results acquisition module 230 may operate are discussed in further detail in relation to stages 520 and 521 of method 500. It is noted that results acquisition module 230 may execute any of the formerly discussed variations of stages 520 and 521, even if not explicitly elaborated.

Processor 220 further includes fitting module 240, which is configured to fit to the inspection results an approximation function from a group of functions. As discussed with respect to stage 530, the group of functions (also referred to as "family of functions) may be related to a response pattern of inspection system 210. As mentioned above, the response pattern may depend on various factors, such as: beam profile, changes the beam undergo before hitting the article (described by a respective transmission function), the interaction characteristics of the article (e.g. described by a respective impulse response function), changes which the refracted/deflected beam undergo before reaching the sensor (described by a respective transmission function), and the way such outgoing signals are modified and then recorded by the sensor (e.g. described by a respective transfer function such as OTF or MTF). The group of functions may be related to any one or more of these factors.

As discussed with respect to method 500, the family of functions may be defined based on the reaction of the inspection system to defect (e.g. based on the impulse response on the system, but possibly based on additional parameters such as typical shape of defects, etc.). The family of functions may thus correspond to the impulse response of the inspection system.

Various groups of functions may be used, and the actual group of functions implemented may be determined by measurements of the inspection system 210 (e.g., by measuring the beam profile) or irrespectively thereof (e.g., by selecting a set of functions which is often used for approximation, such as normal distribution). For example, the group of functions may consist of Gaussians.

Examples of families of functions which may be used by fitting module for the fitting of the approximation function were discussed with respect to method 500, and include, for example: Gaussians, parabolas, convolutions of Gaussians and boxcar functions (or the logs of such convolutions), convolutions of Gaussians and characteristic profile functions which resembles a cross-section of a characteristic inspected part (or the logs of such convolutions), functions which resemble functions of any one or more of the above families, etc.

Referring to the group of functions, it is noted that the group of functions may consist of Gaussians, the group of functions may consist of parabolas, the group of functions may consist of convolutions of Gaussians and boxcar functions. However, other groups of functions may also be used.

Optionally, for each selectable function of the group of functions there exists a corresponding function having an absolute maximum, so that for at least 90% of the possible inputs of the corresponding function within a standard deviation around the absolute maximum of the corresponding function, the deviation between the outcomes of the selectable function and of the respective corresponding function is less than 20%, wherein the corresponding function is either a Gaussian, a parabola, a convolution of a Gaussian and a boxcar, or a log of a convolution of a Gaussian and a boxcar.

As discussed with respect to stage 531, optionally fitting module 240 may be configured to fit the approximation function to processed inspection results which are a result of a processing of the inspection results (e.g. a normalization thereof, log thereof, etc.). The processing of the inspection results may be executed by fitting module 240 or by another module (e.g. results acquisition module 230).

As discussed with respect to method 500 (e.g. with respect to stage 532), optionally fitting module 240 may be configured to fit the approximation function to the inspection results irrespectively of saturated values in the inspection results. Optionally, fitting module 240 (or even results acquisition module 230) may be configured to select to which parts of the inspection results the fitting should apply (e.g., by determining to ignore values of the inspection results which pertain to saturated pixels)

Examples of ways in which fitting module 240 may operate are discussed in further detail in relation to stages 530, 531, and 532 of method 500. It is noted that fitting module 240 may execute any of the formerly discussed variations of stages 530, 531, and 532, even if not explicitly elaborated.

Optionally, size estimation module 250 may be configured to determine the estimated size based on a normalization of the approximation function. It may also be configured to sum discrete values of the approximation function, to apply a correction function to the sum, and to determine the estimated size of the part based on the corrected sum.

Processor 220 also includes size estimation module 250, which is configured to determine an estimated size of the part, based on at least one parameter of the approximation function. Examples of ways in which size estimation module 250 may operate are discussed in further detail in relation to stages 540, 541, 542, and 543 of method 500. It is noted that size estimation module 250 may execute any of the formerly discussed variations of stages 540, 541, 542, and 543, even if not explicitly elaborated.

Referring to system 200 as a whole, it is noted that while the approximation function may belong to a group of functions which is related to a response pattern of inspection system 210, the group of functions may also be predefined otherwise (e.g. by selecting a group of functions which is easily computed and which gives sufficiently good results). For example, system 200 may be configured to estimate the size of the part of the article, including tangible processor 220 which includes:

Results acquisition module 230, configured to acquiring inspection results generated by processing an inspection image which was generated by collecting signals arriving from a portion of the article 10 which includes the part (and possibly also the processing itself);

Fitting module 240, configured to fit to the inspection results an approximation function from a predefined group of functions (this may include normalizing the approximation function, but not necessarily so); and Size estimation module 250, configured to: (a) sum values of the approximation function (the summed values may be discrete, but if the approximation function is continuous, integration may be used instead); (b) optionally—apply a correction function to the sum to provide a corrected sum; (c) determine the estimated size of the part, based on the corrected sum.

The other variations discussed with respect to processor 220 may also be implemented for this variation thereof.

System 200 may include a tangible storage 260 (e.g. a hard-drive disk, a flash drive, etc.) for storing the size estimation (and possibly of additional information pertaining to the estimated part) to a tangible storage. System 200 may also include an output interface 270 for transmitting the size estimation to an external system (e.g. over cable connection or over wireless connection), wherein that external system may in turn act based on the classification.

System 200 may also include an inspection module, which may be the aforementioned inspection machine 210 which provides the aforementioned inspection image by scanning of the inspected articles such as the wafers, and may alternatively be posterior inspection module 280 that is configured to inspect the wafer (or other inspected article) in higher resolution than that of the inspection image. This inspection module may be configured to selectively scan, in a resolution higher than the resolution of the inspection image, parts of the inspected article which are selected based on their estimated size, as determined by size estimation module 250. (e.g. refraining from selecting potential defects which are smaller than a predetermined threshold). The field of view of posterior inspection module 280 may be narrower than that of inspection machine 210, but this is not necessarily so.

It should be noted that inspection machine 210 and/or posterior inspection module 280, if implemented, may be implemented as inspection machines of various types, such as optical imaging machines, electron beam inspection machines, radars, LIDARs and so on.

Generally, identifying defects in a wafer (or in another inspected article) may be implemented using different techniques, among which are optical inspection and electron beam inspection. Utilization of system 200 may facilitate the use of more than a single inspection technique. For example, an initial inspection of the wafer is firstly carried out relatively quickly and in a coarse manner by inspection system 200 (e.g. using an optical inspection or an electron beam inspection set for coarse and fast inspection). Later, some of the potential defects found in the initial inspection (selected based on the classification results of classifier 250) are then studied again using a relatively slower but more exact inspection. Such posterior scanning may be executed either in another mode of inspection machine 210, or in a different posterior inspection module 280 (in a process also referred to as "reviewing", e.g. by DRSEM—Defect Review Scanning Electron Microscope).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It will be appreciated that the embodiments described above are cited by way of example, and various features thereof and combinations of these features can be varied and modified.

While various embodiments have been shown and described, it will be understood that there is no intent to limit the invention by such disclosure, but rather, it is intended to cover all modifications and alternate constructions falling within the scope of the invention, as defined in the appended claims.

What is claimed is:

1. A method for detecting a defect in a nanometric part of an inspected semiconductor wafer, the method comprising:
    acquiring a first plurality of pixel values for a plurality of pixels in a portion of an inspection image comprising the nanometric part of the inspected semiconductor wafer, the first plurality of pixel values generated by processing the inspection image, the inspection image being generated by an inspection system comprising a sensor collecting signals arriving from the portion of the inspected semiconductor wafer;
    determining, by a processor, a type of an illumination beam being transmitted by the inspection system to the inspected semiconductor wafer, wherein interactions of the illumination beam with the inspected semiconductor wafer produce the collected signals at the sensor;
    determining, by the processor, a group of functions to generate a second plurality of pixel values from the first plurality of pixel values, the group of functions determined using the type of illumination beam transmitted by the inspection system;

fitting an approximation function to the first plurality of inspected pixel values;
generating the second plurality of pixel values by using the approximation function selected from the group of functions;
determining, by the processor, an estimated size of the nanometric part, using at least one parameter of the approximation function, the estimated size being measured using a set of deviation values calculated as differences of the second plurality of pixel values generated from fitting the approximation function and a base-level set of pixel values; and
determining, by the processor, whether the defect is present in the nanometric part of the semiconductor wafer using the estimated size.

2. The method according to claim 1, wherein the group of functions is a group of Gaussian functions.

3. The method according to claim 1, wherein the determining the estimated size comprises normalizing the approximation function.

4. The method according to claim 3, wherein the determining the estimated size comprises:
summing discrete values of the approximation function to determine a sum; and
applying a correction function to the sum to determine a corrected sum, wherein the estimated size of the nanometric part is determined using the corrected sum.

5. The method according to claim 1, wherein fitting the approximation function to the inspection results is using values of the approximation function for a limited set of inputs, wherein the determining of the estimated size of the nanometric part is using values of the approximation function for a set of inputs comprising inputs being excluded from the limited set.

6. The method according to claim 1, wherein fitting the approximation function to the inspection results is irrespective of saturated values in the inspection results.

7. The method according to claim 1, wherein the type of illumination beam is one of: a beam of light, a beam of electromagnetic radiation, or a beam of particles.

8. The method according to claim 1, further comprising:
defining the group of functions using a processing of collected signals arriving from a group of semiconductor wafers comprising at least one reference semiconductor wafer other than the inspected semiconductor wafer.

9. A system configured to detect a defect in a nanometric part of an inspected semiconductor wafer, the system comprising:
a memory; and
a processor, coupled to the memory, to:
acquire a first plurality of pixel values for a plurality of pixels in a portion of an inspection image comprising the nanometric part of the inspected semiconductor wafer, the first plurality of pixel values generated by processing the inspection image, the inspection image being generated by an inspection system comprising a sensor collecting signals arriving from the portion of the inspected semiconductor wafer;
determine a type of an illumination beam being transmitted by the inspection system to the inspected semiconductor wafer, wherein interactions of the illumination beam with the inspected semiconductor wafer produce the collected signals at the sensor;
determine a group of functions to generate a second plurality of pixel values from the first plurality of pixel values, the group of functions determined using the type of illumination beam transmitted by the inspection system;
fit an approximation function to the first plurality of inspected pixel values;
generate the second plurality of pixel values by using the approximation function selected from the group of functions;
determine an estimated size of the nanometric part, using at least one parameter of the approximation function, the estimated size being measured using a set of deviation values calculated as differences of the second plurality of pixel values generated from fitting the approximation function and a specified set of pixel values; and
determine whether the defect is present in the nanometric part of the semiconductor wafer using the estimated size.

10. The system according to claim 9, wherein the nanometric part is a defected part of the inspected semiconductor wafer.

11. The system according to claim 9, wherein the processor is to determine the estimated size using a normalization of the approximation function.

12. The system according to claim 11, wherein to determine the estimated size, the processor is to:
sum discrete values of the approximation function;
apply a correction function to the sum to determine a corrected sum; and
determine the estimated size of the nanometric part using the corrected sum.

13. The system according to claim 9, wherein to fit the approximation function to the inspection results is irrespective of saturated values in the inspection results.

14. A non-transitory computer readable medium including instructions that, when executed by a processor, cause the processor to perform operations for detecting a defect in a nanometric part of an inspected semiconductor wafer, the operations comprising:
acquiring a first plurality of pixel values for a plurality of pixels in a portion of an inspection image comprising the nanometric part of the inspected semiconductor wafer, the first plurality of pixel values generated by processing the inspection image, the inspection image being generated by an inspection system comprising a sensor collecting signals arriving from the portion of the inspected semiconductor wafer;
determining, by the processor, a type of an illumination beam being transmitted by the inspection system to the inspected semiconductor wafer, wherein interactions of the illumination beam with the inspected semiconductor wafer produce the collected signals at the sensor;
determining, by the processor, a group of functions to generate a second plurality of pixel values from the first plurality of pixel values, the group of functions determined using the type of illumination beam transmitted by the inspection system;
fitting an approximation function to the first plurality of inspected pixel values;
generating the second plurality of pixel values by using the approximation function selected from the group of functions;
determining, by the processor, an estimated size of the nanometric part, using at least one parameter of the approximation function, the estimated size being measured using a set of deviation values calculated as differences of the second plurality of pixel values generated from fitting the approximation function and a specified set of pixel values; and determining, by the processor, whether the defect is present in the nanometric part of the semiconductor wafer using the estimated size.

15. The non-transitory computer readable medium of claim 14, wherein the nanometric part is a defected part of the inspected semiconductor wafer.

16. The non-transitory computer readable medium of claim 14, wherein the group of functions is a group of Gaussian functions.

17. The non-transitory computer readable medium of claim 14, wherein the determining the estimated size comprises normalizing the approximation function.

18. The non-transitory computer readable medium of claim 17, wherein the determining the estimated size comprises:

summing discrete values of the approximation function to determine a sum; and applying a correction function to the sum to determine a corrected sum, wherein the estimated size of the part is determined using the corrected sum.

19. The non-transitory computer readable medium of claim 14, wherein fitting the approximation function to the inspection results is using values of the approximation function for a limited set of inputs, wherein the determining of the estimated size of the nanometric part is using values of the approximation function for a set of inputs comprising inputs being excluded from the limited set.

20. The non-transitory computer readable medium of claim 14, wherein fitting the approximation function to the inspection results is irrespective of saturated values in the inspection results.

* * * * *